(12) United States Patent
Poirier et al.

(10) Patent No.: US 10,650,527 B2
(45) Date of Patent: May 12, 2020

(54) SYSTEMS AND METHODS FOR SAMPLE VERIFICATION

(71) Applicant: Qualigen, Inc., Carlsbad, CA (US)

(72) Inventors: Michael Poirier, Vista, CA (US); John Stephen Middleton, Carlsbad, CA (US); Suzanne Marie Poirier, Vista, CA (US)

(73) Assignee: Qualigen, Inc., Carlsbad, CA (US)

( * ) Notice: Subject to any disclaimer, the term of this patent is extended or adjusted under 35 U.S.C. 154(b) by 110 days.

(21) Appl. No.: 15/755,868

(22) PCT Filed: Sep. 4, 2015

(86) PCT No.: PCT/US2015/048582
§ 371 (c)(1),
(2) Date: Feb. 27, 2018

(87) PCT Pub. No.: WO2017/039690
PCT Pub. Date: Mar. 9, 2017

(65) Prior Publication Data
US 2018/0342062 A1    Nov. 29, 2018

(51) Int. Cl.
  G06T 7/62        (2017.01)
  G06T 7/13        (2017.01)
  G01N 21/25       (2006.01)
  G01N 21/59       (2006.01)
  G01N 15/08       (2006.01)
(Continued)

(52) U.S. Cl.
CPC ............... *G06T 7/13* (2017.01); *G01N 21/25* (2013.01); *G01N 21/5907* (2013.01); *G06T 7/62* (2017.01); *G01F 1/00* (2013.01); *G01N 21/8483* (2013.01); *G01N 2015/0846* (2013.01); *G06T 2207/20021* (2013.01)

(58) Field of Classification Search
None
See application file for complete search history.

(56) References Cited

U.S. PATENT DOCUMENTS

| 5,452,619 A | 9/1995 | Kawanabe et al. |
| 6,060,320 A | 5/2000 | Dorenkott et al. |
| 6,309,886 B1 | 10/2001 | Ambrose et al. |

(Continued)

FOREIGN PATENT DOCUMENTS

| AU | 2013205020 A1 | 5/2013 |
| JP | 2011508589 A | 3/2011 |

(Continued)

OTHER PUBLICATIONS

Abdu et al., "A review and analysis of image segmentation approaches in change detection analysis," IJOART, Nov. 2014; 3(11):159-163.

(Continued)

*Primary Examiner* — Eileen M Adams
(74) *Attorney, Agent, or Firm* — Umberg Zipser LLP

(57) ABSTRACT

The inventive subject matter is directed to point-of-care analytical devices that accurately determine the volume of test samples using image analysis to improve the accuracy of test results performed on the sample. Most preferably, the image analysis is based on rate changes in optical saturation that parallels sample saturation in a porous structure containing the sample.

10 Claims, 6 Drawing Sheets

(51) Int. Cl.
  *G01F 1/00* (2006.01)
  *G01N 21/84* (2006.01)

(56) References Cited

U.S. PATENT DOCUMENTS

| | | |
|---|---|---|
| 6,642,058 B2 | 11/2003 | Sugaya et al. |
| 7,174,774 B2 | 2/2007 | Pawar et al. |
| 7,247,483 B2 | 7/2007 | Halg et al. |
| 7,511,818 B2 | 3/2009 | Pages Pinyol |
| 8,737,704 B2 | 5/2014 | Maltbie et al. |
| 8,883,509 B2 | 11/2014 | Lemme et al. |
| 2002/0120410 A1 | 8/2002 | Pourdeyhimi |
| 2009/0107234 A1 | 4/2009 | Kim et al. |
| 2011/0226045 A1 | 9/2011 | McQuillan |
| 2012/0196374 A1 | 8/2012 | Haga |
| 2012/0309636 A1 | 12/2012 | Gibbons et al. |
| 2013/0220807 A1* | 8/2013 | Radomyshelsky .. G01N 27/333 204/406 |
| 2014/0161318 A1 | 6/2014 | Jansen |
| 2014/0218557 A1* | 8/2014 | Ebe ............ H04N 5/2351 348/222.1 |
| 2014/0273188 A1* | 9/2014 | Mohan ............ G01N 21/0303 435/287.2 |
| 2017/0042460 A1* | 2/2017 | Holmes ............ A61B 10/0045 |

FOREIGN PATENT DOCUMENTS

| | | |
|---|---|---|
| JP | 2011508589 A5 | 7/2012 |
| KR | 1020140005335 A | 1/2014 |
| RU | 2493563 C2 | 9/2013 |
| WO | 9502166 A1 | 1/1995 |
| WO | 2009002447 A1 | 12/2008 |
| WO | 2012100235 A2 | 7/2012 |

OTHER PUBLICATIONS

Darnault et al., "Measurement of fluid contents by light transmission in transient three-phase oil-water-air systems in sand," Water Resources Research, vol. 37, No. 7, pp. 1859-1868, Jul. 2001.

Radke et al., "Image Change Detection Algorithms: A Systematic Survey," IEEE Transactions on Image Processing, vol. 14, No. 3, Mar. 2005.

Raja et al., "Horizontal liquid spreading behavior of hybrid yarn woven fabric using embedded image analysis principal" Indian Journal of Fibre & Textile Research, vol. 37, Dec. 2012, pp. 381-384.

Zand et al. , "A Simple Laboratory Experiment for the Measurement of Single Phase Permeability" Journal of Physical and Natural Science, vol. 1, Issue 2, 2007.

International Preliminary Report on Patentability for Application No. PCT/US2015/048582, dated Dec. 4, 2017, 18 pgs.

International Preliminary Report on Patentability for Application No. PCT/US2015/048582, dated May 19, 2016, 24 pgs.

Yimsiri and Likitersuang, "Assessment of Liquid Saturations in Sand by Image Analysis." http://www.researchgate.net/publication/235931094.

* cited by examiner

SYSTEMS AND METHODS FOR SAMPLE VERIFICATION

FIELD OF THE INVENTION

The field of the invention is analytical devices, methods, and use of controllers that accurately determine the volume of test samples to improve the accuracy of test results.

BACKGROUND

The background description includes information that may be useful in understanding the present invention. It is not an admission that any of the information provided herein is prior art or relevant to the presently claimed invention, or that any publication specifically or implicitly referenced is prior art.

Point-of-care analytical devices have increasingly become an attractive option in physician's offices and homes as a way to decrease patient costs and increase the speed of test results and disease diagnosis. These devices offer many advantages over the use of traditional laboratories for conducting tests and diagnosing diseases. For example, support staff can operate analytical devices with minimal training and can perform various in vitro diagnostic tests on blood (serum and/or plasma), urine, cerebrospinal fluid or other biological fluids in a matter of minutes while a patient waits.

Despite their many advantages, point-of-care analytical diagnostic devices generally can be prone to errors. For example, human errors, such as errors in sample extraction, pipetting, etc., can cause problems with the analysis by introducing variations in the tested sample volumes. In addition, most point-of-care devices are insensitive to changes in sample quality, integrity, and composition (e.g. from hemolysis of blood) that can also decrease the accuracy of these devices.

U.S. Patent Application US 2015/0086970 to Poirier describes a whole blood analytic device with many of the advantages described above. These and all other extrinsic materials discussed herein are incorporated by reference in their entirety. Where a definition or use of a term in an incorporated reference is inconsistent or contrary to the definition of that term provided herein, the definition of that term provided herein applies and the definition of that term in the reference does not apply. Poirier describes an analytical device with a solid porous structure that separates a blood containing fluid for analysis. However, the device does not positively determine the sample volume to be analyzed, but relies on the assumption that the solid porous structure is saturated. Moreover, the device is unable to detect flaws in the solid porous structure, detect when insufficient sample is added, or detect errors in the integrity of the sample, such as hemolysis.

Some effort has been made to improve the accuracy of these devices. For example, U.S. Pat. No. 6,060,320 to Dorenkott and Panek describes a method of verifying the volume of an aspirated liquid in an automatic diagnostic system. The system in Dorenkott and Panek determines volume from the pressure needed to aspirate the liquid. However, although the system in Dorenkott and Panek can detect volume of a sample, it is expensive and suffers from a number of deficiencies that make it less ideal in a point-of-care setting.

U.S. Pat. No. 7,247,483 to Halg et al. describes a method for determining the volume of a sample of a liquid by the addition of a chromophore to the sample. The volume of the sample can be determined by measuring the chromophore concentration in the sample, however, this approach still leaves room for human error and may interfere with downstream assays, especially assays based on colorimetric of fluorescence signal.

U.S. Patent Application US 2012/0309636A1 to Gibbons et al. teaches systems, devices and methods for the automatic detection of analytes in a bodily fluid. The system and methods in Gibbons et al. use a light source and a camera to measure and verify sample volume in a pipette tip or cuvette. However, especially at relatively small volumes, errors can readily occur due to variations in surface tension, presence of air bubbles, and incomplete wetting of the sample to the pipette tip. Still further, Gibbons et al. require measurement of absorbance, which can be affected by one or more analytes in the sample having similar absorption characteristics.

Therefore, even though various methods and systems for sample measurement are known in the art, all or all of them suffer from one or more disadvantages. Thus, there is a need for improved sample verification systems and methods in analytical diagnostic devices.

SUMMARY OF THE INVENTION

The inventive subject matter provides apparatus, systems and methods in which one can determine the volume of a sample in a porous structure. The sample volume can then be used in downstream calculations to obtain more accurate results from assays performed on the sample.

In one aspect of the inventive subject matter, the inventors contemplate a device for determining a fluid volume contained in a container having a porous structure. Especially contemplated devices include a holder that retains a sample receiving compartment, wherein the porous structure is at least partially disposed in the sample receiving compartment, a camera to take at least one image of the porous structure, and a controller that is communicatively coupled to the camera. In particularly preferred aspects, the controller is programmed to: detect an area of the porous structure in the image of the porous structure; divide the area of the porous structure into a plurality of segments; determine an optical saturation value for each one of the plurality of segments, wherein each of the optical saturation values correlates with a degree of sample saturation of the porous structure; and calculate at least one of a sample volume, a sample saturation speed, an indicator of sample quality, a correction factor, and a corrected test result as a function of the optical saturation value and a wicking time of at least one of the plurality of segments. It should also be appreciated that a sample volume, a sample saturation speed, an indicator of sample quality, a correction factor, and a corrected test result can be correlated with the area of the porous structure (e.g., in square mm) that has an optical saturation value below a threshold optical saturation value.

While not limiting to the inventive subject matter, it is generally preferred that the porous structure is or comprises a round or ellipsoid shape, and/or that the porous structure is deformable such that the porous structure is capable of repeatedly soaking in and expressing out reagents. Additionally, it is contemplated that the device may also comprise an actuator that stops a sample from flowing from a sample application location to the porous structure, and that the controller is programmed to calculate the sample volume in the porous structure in real time and to trigger the actuator to stop flow when the sample volume reaches a predetermined threshold. Where desirable, the controller may also determine if an assay should be performed using the fluid volume. In still further contemplated aspects, the controller is programmed to process the optical saturation values in a grayscale, and/or to determine the optical saturation value for each one of the plurality of segments at least once every 30 s, preferably every 10 s.

With respect to the sample receiving compartment it is contemplated that the sample receiving compartment is at least partially formed from a transparent polymer (but may also include a non-transparent housing portion). Most typically, a camera and a light source are positioned relative to the sample receiving compartment to reduce image capture of light reflected of the transparent polymer. In one embodiment, a Cognex A100 camera and a blue LED having a peak emission wavelength at about 490 nm can be employed.

In another aspect of the inventive subject matter, the inventors contemplate an analytic device that comprises an image acquisition system configured to acquire an image of a porous structure that is at least partially disposed in a sample receiving compartment. The image is preferably an 8-bit grayscale image. The image acquisition system is also configured to calculate a sample saturation of the porous structure, a sample volume in the porous structure, a correction factor, and a corrected test result from the optical saturation values of the image of the porous structure. In yet another aspect of the inventive subject matter, the analytic device can include an actuator that is configured to stop a sample from flowing from a sample application location to the porous structure when the calculated sample volume reaches a predetermined threshold.

Therefore, the inventors also contemplate a controller for correlating a plurality of optical saturation values of an image of a porous structure with a sample volume in the porous structure. Preferred controllers feature a processor configured to divide the image into a plurality of segments and to assign respective optical saturation values for each segment for at least a first and second time point. Using differences between the respective optical saturation values for each segment, contemplated processors also calculate: a normalized optical saturation value for each one of the plurality of segments, a sample saturation of each one of the plurality of segments, a saturation speed, a correction factor, a corrected test result, and/or an indicator of sample quality. It should be appreciated that the processor can calculate the differences in optical saturation values in grayscale. Moreover, the processor can be configured to signal an actuator to stop sample flow into the porous structure when a predetermined sample saturation is achieved in the porous structure.

Viewed from a different perspective, the inventors also contemplate methods of determining sample volumes within porous structures. Methods according to the inventive subject matter include the steps of: acquiring a plurality of images of the porous structure over time; dividing at least a portion of each acquired image into a plurality of segments; using the plurality of acquired images to determine for each segment respective saturation values over time; and correlating changes in saturation value for each segment with the sample volume in the porous structure at a time. It should be appreciated that the method can further include a step of triggering an actuator to stop a sample from flowing into the porous structure when the determined sample volume reaches a predetermined threshold. In some circumstances, the method can include the step of correlating changes in saturation value for each segment with integrity of the porous structure or sample quality.

Thus, a method of adjusting a test result of a sample by a correction factor includes: determining time to sample saturation of a predetermined segment within a porous structure using a series of optical saturation measurements for each of the predetermined segments; determining a correction factor by correlating the time to sample saturation for each predetermined segment with a reference rate indicative of an a priori known volume; and correcting the test result of the sample using the correction factor to thereby obtain the adjusted test result. The method can be modified to include determining sample integrity using the series of optical saturation measurements for each of the predetermined segments.

Viewed from yet another perspective, a method of controlling sample quality includes the steps: measuring an optical saturation value from a porous structure at specified time intervals; determining a saturation rate; calculating a difference between the change in saturation rate with a reference saturation rate indicative of at least one of an intact sample and a compromised sample; and using the difference between the saturation rate and the reference saturation rate to generate an indicator of sample quality. Such methods can further include a step of using the indicator of sample quality to determine if an assay should be performed on the sample.

Therefore, methods of quality control for a wicking integrity of a fluid receiving portion of a porous structure are contemplated. Preferred methods include the steps of: measuring a sample saturation speed for a plurality of segments of the porous structure, wherein measurement is performed using image analysis of a grayscale image of at least a portion of the porous structure; detecting a discontinuity in saturation speed between the segments of the porous structure; and generating an alert when the discontinuity is detected. The method can optionally include generating a sample quality alert using the sample saturation speed for the plurality of segments of the porous structure.

Various objects, features, aspects and advantages of the inventive subject matter will become more apparent from the following detailed description of preferred embodiments, along with the accompanying drawing figures in which like numerals represent like components.

DETAILED DESCRIPTION

The inventors discovered that a sample volume can be determined by tracking the migration of a sample within a porous structure. A preferred embodiment of the inventive subject matter comprises an analytical device, which obtains images of the porous structure at several time intervals. The images of the porous structure are divided into segments that can also be referred to as zones or regions. Surprisingly, optical saturation values for each zone at each time point correlate with sample saturation rates/speeds, sample volumes, correction factors, indicators of sample quality, and indicators of porous structure integrity. Segmenting the porous structure into zones advantageously facilitates data analysis, although the inventors contemplate embodiments in which the analytical device analyzes unsegmented images as well. In further aspects of the inventive subject matter, systems, methods, and uses of controllers are contemplated in which users determine the volume of a sample in a porous solid and use the sample volume to obtain more accurate results from assays performed on the sample.

Figure 1A:
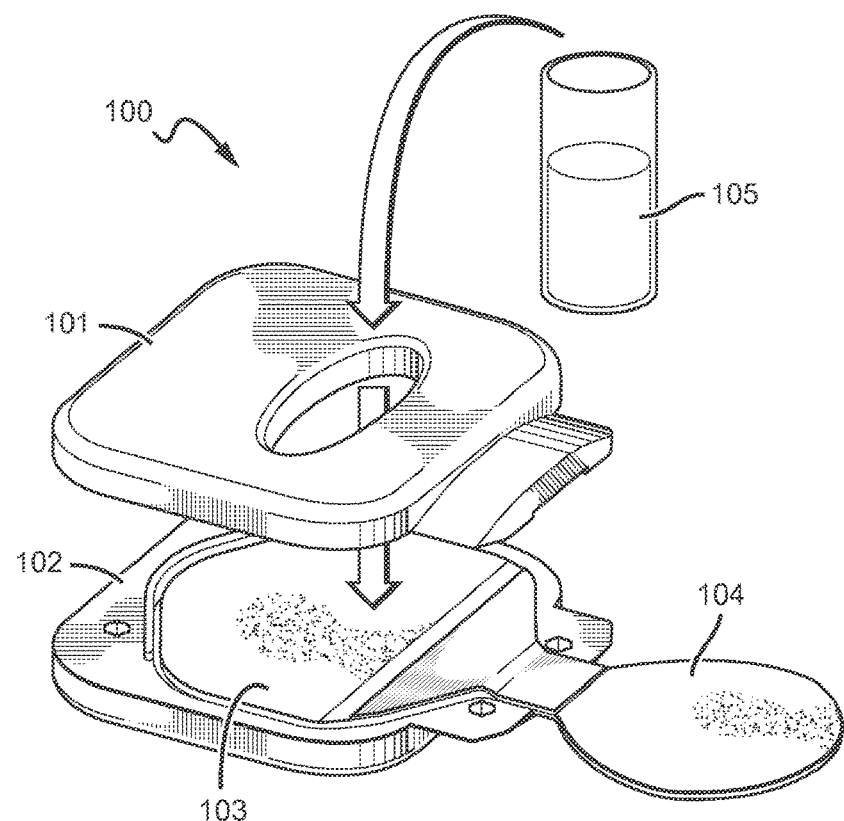
FIG. 1A shows an exemplary sample applicator having a housing with a sample application location and a porous structure fluidly extending from the application location into the sample receiving compartment (not shown)

A preferred embodiment of the inventive analytical device for determining the volume of a fluid within a porous structure includes a holder, a camera, and a controller. Preferred holders are configured to retain containers that have sample applicators, sample receiving compartments, and reagent compartments. FIG. 1A shows an exemplary embodiment of a sample applicator 100, wherein the top 101 is shown separated from the bottom 102, so that the sample application location 103 and the porous structure 104 are visible. A user applies the sample 105 to the sample application location 103 through the opening in the top 101. The sample application location 103 absorbs the sample, which then wicks into the porous structure 104. The porous structure 104 is partially disposed in the sample applicator 100 (e.g., the porous structure 104 extends into the sample applicator, below the sample application location 103). Such configurations are especially suitable for managing biological fluid samples (e.g., blood, serum, plasma, urine, cerebrospinal fluid, saliva, etc.). In applications where it is desirable to separate the serum from whole blood before further analysis, the sample application location 103 can comprise a hydrophobic separation membrane, which produces a cell fraction and a plasma (or serum) fraction.

The sample application location 103 and the porous structure 104 can be fluidly coupled to allow flow of the plasma fraction between the sample application location 103 and the porous structure 104. The flow of the plasma fraction between the sample application location 103 and the porous structure 104 may be accomplished in a variety of manners. For example, an area of the sample application location 103 can be in direct contact with an area of the porous structure 104 wherein the contact between the sample application location 103 and the porous structure 104 cause the flow of the plasma fraction, typically by capillary force. Alternatively, the sample application location 103 and the porous structure 104 can be coupled by an intermediate membrane which makes contacts with an area of the sample application location 103 and the porous structure 104. Using an intermediate membrane allows for the possibility that a higher volume of plasma fraction may be captured. In addition, the intermediate membrane may further separate blood into a cell fraction and plasma fraction or capture the plasma fraction. Other possibilities for the intermediate membrane may comprise of other known techniques of separation, such as a filtering system with descending pore size using a combination of glass fiber membranes and cellulose membranes. It should be appreciated that similar sample application location and porous structure configurations can be adapted for analysis of urine, saliva, cerebrospinal fluid, and other liquid samples.

Advantageously, an absorptive porous structure can use capillary action to wick a sample without pumps and/or pipettes. It has not yet been appreciated that the rate of saturation of such porous structures can be used as a proxy measure of attainable values including sample volumes, analyte concentrations, and indicia of the integrity of the porous structure, for example. Previous systems have relied on the assumption that the porous structure was completely saturated and lacked the ability to positively verify sample quality/porous structure integrity.

In a further preferred embodiment, porous structure 104 may be composed of a hydrophilic membrane/medium, which has a void volume for the collection of a predetermined volume of plasma. For example, an Ahlstrom Cytosep® 1660 or polyurethane, TPU and cross-linked membranes. Additionally, the void volume may be uniform or may vary throughout the porous structure 104 so the void volume may control the flow of the plasma fraction (or urine, cerebrospinal fluid, sweat, semen, amniotic fluid, synovial fluid, pleural fluid, pericardial fluid, peritoneal fluid, or saliva). It can be appreciated that the porous structure 104 can be compressible which means that it can be of flexible, rigid, or a combination as long as it is capable of being compressed for the restriction of flow between the sample application location 103 and the porous structure 104. It should also be appreciated that when a compressible porous structure 104 is repeatedly deformable, the samples can be expressed from the porous structure by compression of the porous structure, and samples and/or reagents can be soaked into the porous structure as the porous structure expands.

Porous structures can also accommodate a range of fluid volumes, which can be difficult to measure unless sample saturation can be associated with an optical saturation (e.g., by analysis of a grayscale image). The volume of liquid that the porous structure can accommodate includes the volumes of the pores, channels, cavities/pockets, and the exterior surface. Typically the porous structure can accommodate a sample volume of between 100 nL and less than 1 mL, more typically between 100 nL and less than ½ mL, and even more typically between 100 nL and less than 400, 300, 200, 190, 180, 170, 160, 150, 140, 130, 120, 110, 90, 80, 70, 60, 50, 40, 30, 20, 10, or 5 μL. To use optical saturation as a proxy for sample/fluid volume, the external appearance needs to be representative of the degree of saturation throughout the width and thickness of the porous structure (or portion thereof) such that sample saturation of the porous structure (or portion thereof) is a function of optical saturation. Preferred embodiments of the inventive subject matter employ porous structures 104 having a width of less than 50 mm, and more preferably less than 30 mm, and typically at least 2 mm. With respect to the thickness of the porous material, contemplated porous structures have a thickness of less than 1 mm, and more typical porous structure thicknesses range from 2-20, 20-50, 50-100, 100-200, 200-250, 250-500, 500-750, and 750-1000 μm.

The inventors discovered that the shape of porous structure 104 can be selected such that the liquid front wicking through porous structure 104 is substantially uniform. The inventors discovered that when the portion of porous structure 104 that extends from the sample receiving compartment 100 has a round (e.g., circular or ellipsoid), rather than square, geometry, the liquid front remains substantially linear as it advances through the porous structure 104, even as the width of the porous structure increases at greater distances from the sample receiving compartment. The technical effect of having a linear liquid front is that it is easier to segment the porous structure 104 for analysis as described herein.

In further embodiments, the porous structure can be chemically treated to modify the optical properties of the porous material, enhance or correct for chemical interference in downstream assays, or introduce a reference substance for result validation/calibration. For example, the porous structure can be treated with bleaches (e.g., sodium hypochlorite or hydrogen peroxide) to increase the whiteness of the porous structure. The porous structure can also be treated with buffer salts (e.g., phosphates, carboxylic acid/acetate salts, ammonium chlorides, TRIS, etc.), hydrophilic coatings, hydrophobic coatings, anticoagulants (e.g., sodium, lithium, and/or ammonium Heparin salts, sodium citrate, theophylline, adenosine, and/or dipyridamole), preservatives, antioxidants (e.g., reducing agents such as thiols, ascorbic acid, and/or polyphenols), or other reagents (e.g., protease, DNase, RNase, and dye-based indicators). Finally, the porous structure 104 may extend from the sample applicator device into one or more compartments or conduits.

Figure 1B:
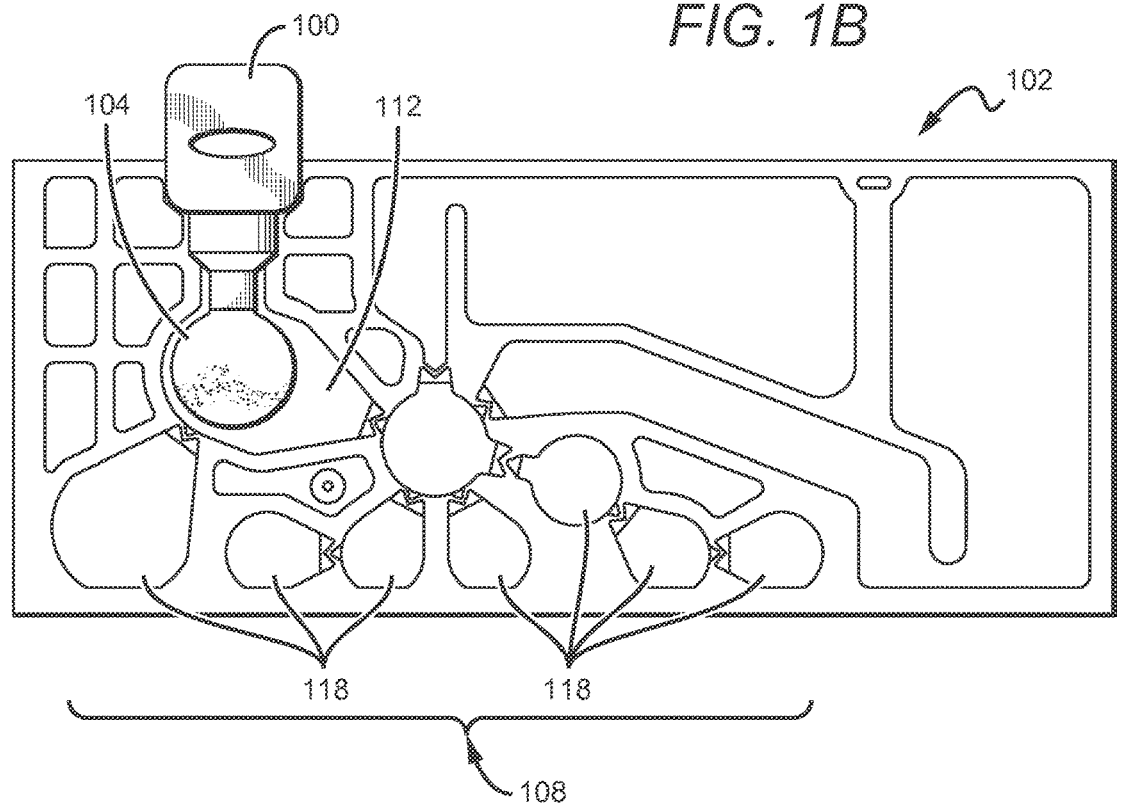
FIG. 1B shows an exemplary container with a sample applicator and the porous structure in the sample receiving compartments.

FIG. 1B shows one configuration of the sample applicator 100 and porous structure 104 in the sample receiving compartment 112 of container 102. Porous structure 104 extends from the sample applicator 100 into the sample receiving compartment 112. Reagents 118 can then be introduced to the sample receiving compartment 112 by breaking the seal(s) between the sample receiving compartment 112 and one or more reagent compartments 108. Preferred containers are made of flexible plastic with compartments and channels formed by heat seals. By having a flexible pouch, the analytic device is capable of bending without breaking. Nevertheless, the test pouch can also be rigid or a combination of rigid and flexible components so long as some degree of bending is allowed to withstand the force of a compressive actuator. Finally, contemplated analytic devices can be reusable or non-reusable. Such containers are suited for use in point-of-care analytical devices. Exemplary devices are described in U.S. Pat. No. 8,052,929 to Breidenthal et al. and U.S. Patent Application US 2015/0086970 to Poirier.

Analytical devices described herein may comprise of actuators which can generally function to isolate a portion of the plasma (or other fluid) fraction by restricting the flow of the plasma fraction from the sample application area into or within the porous structure, and subsequently compressing the thusly isolated portion to cause the isolated portion to flow. Moreover, it may be possible that actuators may be used to introduce different reagents to the isolated portion by compressing adjacent chambers wherein the mixture in the isolated portion is then compressed into a chamber. It is generally preferred that a first actuator is configured as a knife edge. The knife edge can come in a plurality of forms such as a curved shape, a compound edge from multiple components, a series of pins, and a combination thereof, so long as the knife edge is capable of restricting the flow of the plasma fraction between the first and porous structures. Regardless of shape and dimensions, it should be appreciated that suitable edges will be able to at least temporarily restrict the flow of the plasma fraction from the sample application location to the porous structure. In further embodiments, the knife edge may be locked by a locking mechanism. It is also contemplated that the knife edge could be part of the pouch or even snaps into place. If multiple edges are used, the edges may be individually controlled or controlled in common. With respect to a second actuator, the second actuator may comprise of some of the characteristics of the first actuator so long as flow is created of a metered volume of the plasma fraction when compressing the second area into at least one of the sample receiving compartment and a second compartment. Furthermore, it is contemplated that the second actuator can compress at least one of a portion of the metered volume and the entire metered volume. It may follow that if the second actuator may compress a portion of the metered volume, the second actuator may compress portions of the metered volumes into different compartments. Finally, it may be possible that contemplated analytical devices may use a single actuator. The single actuator can compress a first area to restrict the flow of the plasma fraction between the first and porous structure and possibly compress a second area by rolling from the position of the first area onto a second area, thus causing flow of a metered volume of the plasma fraction.

It should be further appreciated that actuators of contemplated analytical devices may be made of a variety of materials. The actuators may be made of metals, polymers, and composites so long as the structure is stable enough to compress a first area to restrict flow and a second area to cause flow of a metered volume. Moreover, it may be possible that the actuators are automated and/or manual.

With respect to the metered volume of the plasma (or other fluid) fraction, it is generally preferred that the metered volume can be determined by at least one actuator and/or a void volume in the porous structure of the plasma separation device. The porous structure may be manipulated in size and shape depending upon the volume of plasma that must be captured. As described above, the porous structure may also be comprised of a plurality of materials and configurations which may affect the metered volume. It is further preferred that a flow of the metered volume is created by the compression of the second area which is isolated by the compression of the first actuator. Finally, it is contemplated that the metered volume can be determined by use of multiple and fluidly independent strips in the porous structure which interact with the plasma separation device.

Contemplated analytical devices can comprise of a third compartment that includes a reagent which is fluidly coupled to the sample receiving compartment to allow flow of the reagent into the porous structure. Moreover, the third compartment may be fluidly coupled where an actuator compresses an area of the third compartment and the reagent housed within flows out to the sample receiving compartment. Additionally, the porous structure and the third compartment can be coupled by having multiple layers interconnected, having the porous structure extend into the third compartment, and/or any other means that encourage the porous structure and the third compartment to interact. The reagent can be introduced for the purposes of accelerating the separation of plasma fraction and cell fraction, indicating a sufficient amount of plasma fraction within the porous structure and/or preparing a portion of the blood-containing fluid for an analytical test. Finally, it is possible that the reagent remains in the sample application location of the plasma separation device and/or travels into the porous structure of the plasma separation device. Further, the inventors contemplate that such analytical devices can be adapted for analysis of other biological fluids, such as urine, cerebrospinal fluid, semen, sweat, amniotic fluid, synovial fluid, pleural fluid, pericardial fluid, peritoneal fluid, and saliva.

Figure 2A:
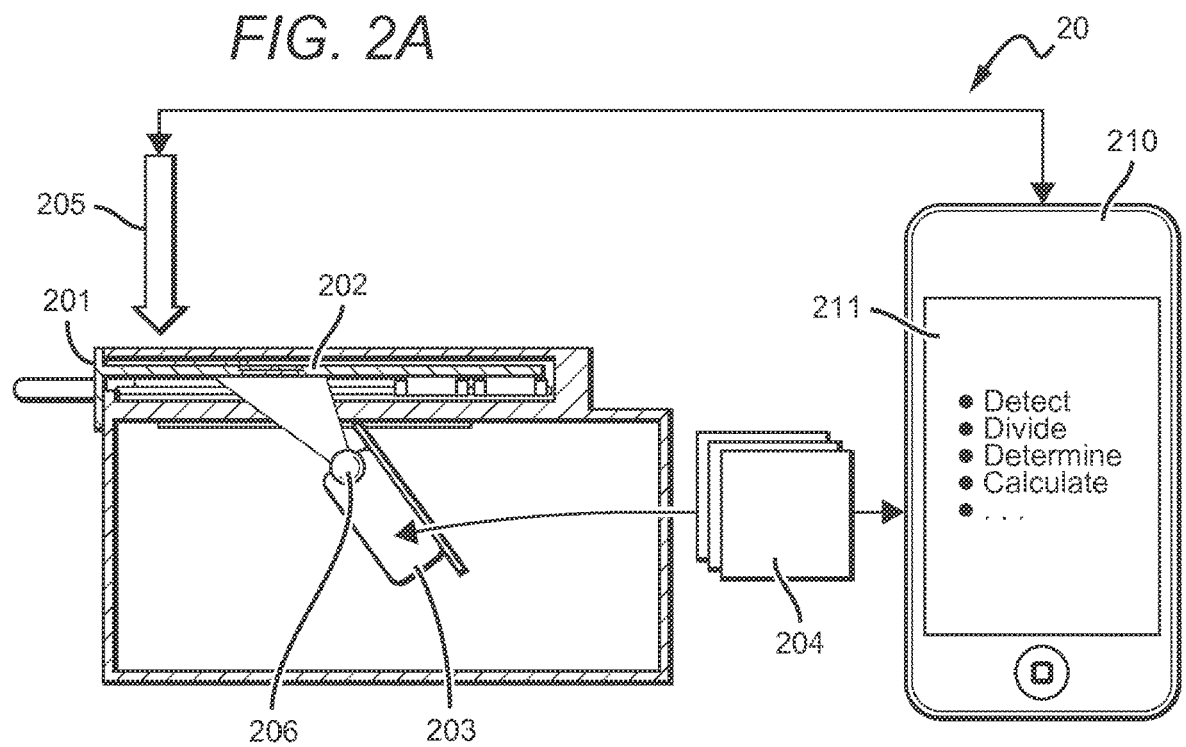
FIG. 2A shows a cross section of an exemplary analytical device.
Figure 2B:
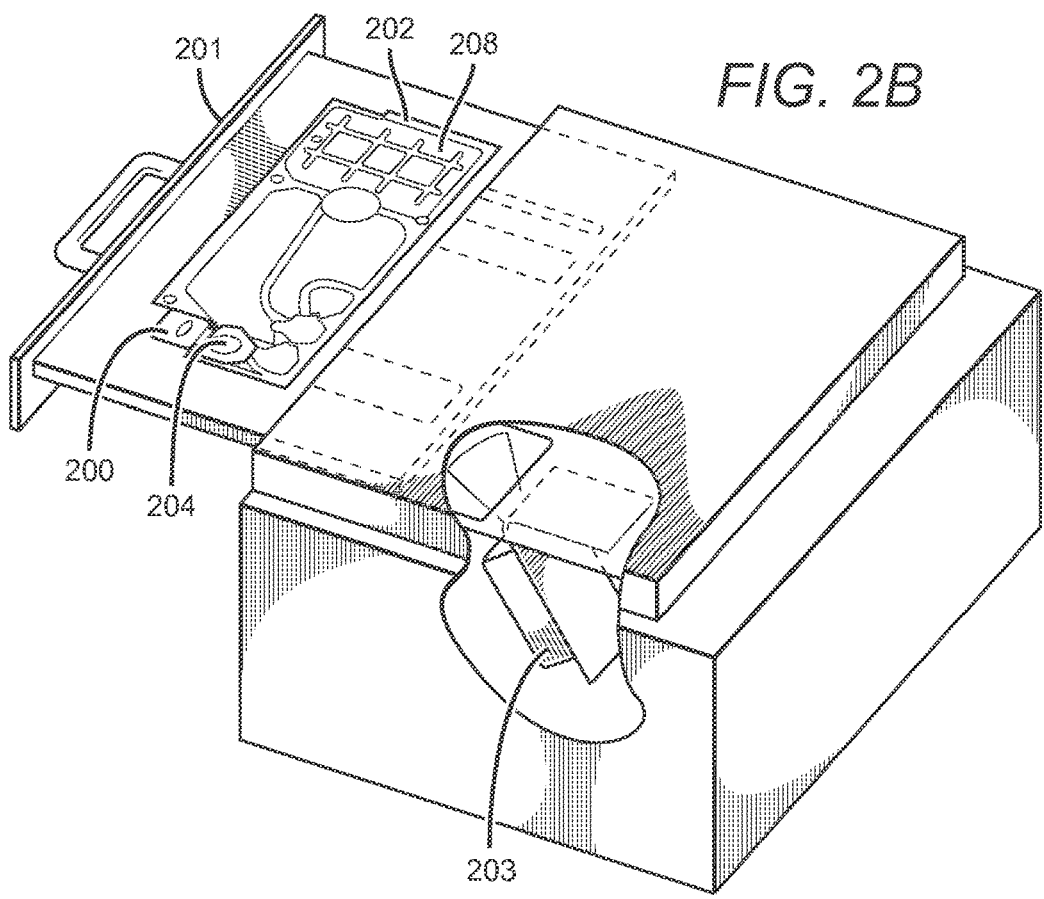
FIG. 2B shows a perspective view of the exemplary device with a FastPack® (Qualigen, 2042 Corte Del Nogal, Carlsbad, Calif. 92011) pouch inserted into a drawer.

Suitable holders retain the containers so that images can be taken of the porous structure, typically while being disposed in a sample receiving compartment of a test pouch. FIGS. 2A and 2B show a schematic of an example analytical device. The holder 201 is a sliding drawer. Additionally, the inventors contemplate that holder 201 could be a slot, a cabinet, or any other commercially suitable holder configuration can be employed. For, example the holder can be positioned in a tilting door in a manner similar to the slot for an audio cassette in the door of a cassette player. It should be appreciated that suitable holders can withstand the pressure applied to the containers by the actuators. For example, one side of the holder can comprise a plate that is positioned opposite to the actuators.

The camera 203 is configured to take images of the porous structure 204 that extends from the sample receiving compartment retained by the holder 201. In one embodiment, camera 203 can be an 8-bit grayscale camera. The inventors also contemplate that 10-bit, 12-bit, 14-bit, 16-bit, 32-bit, or 64-bit cameras can be used. Additionally, the use of color (e.g., CYMK and/or RGB) cameras is not excluded. Where desirable, color images can be converted to grayscale using image processing software. Moreover, the camera may be used in conjunction with filters, screens, and other components to render image analysis independent of the color of a sample, or at least reduce the influence of sample color on optical analysis as further described below. The images may be taken at defined time intervals. For example, images can be taken every 100, 50, 30, 20, 15, 10, 5, or 1 seconds. Rather than discrete images, the camera can optionally be configured to record video.

In the embodiment shown in FIGS. 2A and 2B, camera 203 is positioned at an angle relative to the porous structure to prevent the camera from merely capturing light reflected from intervening layers of glass and/or plastic from the holder 201 and container 202, because the images of the porous structure 204 are used for the volume determination, not the container 202 or holder 201. Typically, the angle between the plane of the porous structure and the axis of focus lies between 0 and 90 degrees. More typically, the angle is between 25 and 85 degrees, and even more typically the angle is between 40 and 70 degrees. It should be appreciated that the angle between the camera and the plane of the porous structure 204 is less critical when camera 203 employs fisheye or fixed focus lenses. In FIGS. 2A and 2B, camera 203 is shown in an angled pitch-catch arrangement with respect to holder 201 and illumination source 206. In yet further contemplated embodiments, one or more additional cameras could be used to acquire images of porous structure 204. Moreover, it should be recognized that image acquisition at an angle also reduces reflected and/or refracted light from the container, allowing for a higher signal-to-noise ratio.

Controller 210 is communicatively coupled to the camera 203. It is also contemplated that the controller can be integrated with the camera 203. The controller further comprises processor 211, which processes images 204 obtained by the camera by detecting an area of the porous structure (e.g., using a blob tool). Alternatively, the camera can be fixed in a position such that it is aligned with the porous structure when containers are loaded into the holders. Thus, the camera takes images in which the position of the porous structure is consistent, and no blob tool may be required to locate the porous structure. The inventors also contemplate that the camera(s) could be replaced with ports for smart phones, such as iPhone®, Android™, and Samsung Galaxy S®. Moreover, the smart phone can include software that enables the smart phone to perform the functions of the camera, controller, data analysis, etc.

Figure 3:
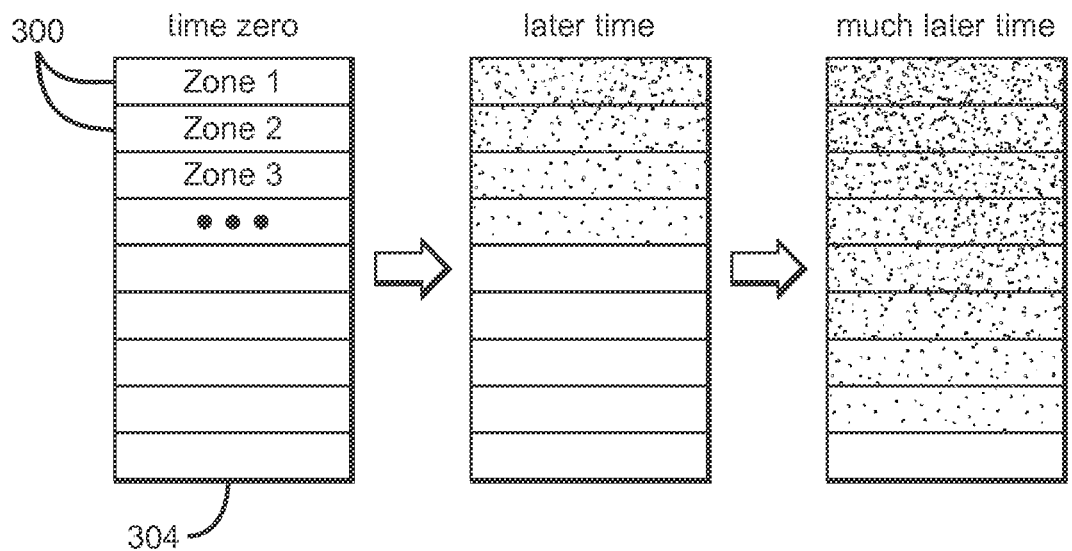
FIG. 3 is a schematic representation of optical saturation value changes over time in a plurality of segments (Zone 1, . . . ) within the porous structure.

A schematic representation of how the controller processes images is illustrated in FIG. 3. The controller divides each image of porous structure 304 into segments 300. When desirable, the controller can assign uniquely identifiable by indicia (e.g., Zone 1, Zone 2, etc. or Region 1, Region 2 etc.) to the segments. Exemplary analytical devices/controllers divide porous structures into 100, 50, 25, 20, 15, 10, 9, 5, or fewer segments. Preferred embodiments divide the porous structure into 20 segments. Although the inventors discovered that dividing the porous structure into 20 segments does not lead to a significant loss of detail, the inventors contemplate that image analysis could be performed on whole images, or whole porous structures located within images of the sample receiving compartment and/or pouch. Most typically, division of the image into segments allows for kinetic changes of optical saturation and as such enables more accurate volume determination as well as determination of sample integrity and other parameters (e.g., confirmation that porous structure has structural integrity, detection of air bubbles, etc.). Moreover, the segments are typically shaped or aligned with the front of the fluid as the fluid enters the porous structure. Once more such alignment enables a more fine-grained analysis and allows for kinetic analyses (rather than relying on an average grayscale per entire area).

Next, the controller determines an optical saturation value for each of the segments in a single image, wherein optical saturation values correlate with a degree to which the sample has saturated the porous structure. It should be appreciated that in most cases optical saturation is independent of downstream analyte detection (i.e., the optical saturation is determined with respect to the porous structure in the sample receiving compartment, and analyte detection is performed in a different compartment.). Moreover, optical saturation values are used to determine sample volume rather than analyte measurements. The degree of sample saturation ranges from substantially dry, wherein the porous structure may contain some adsorbed moisture, e.g., from ambient moisture in air to fully saturated. For the purpose of this disclosure, a porous structure is deemed saturated when the sample substantially fully occupies the void volume of the porous structure (i.e., porous structure will take up by capillary action no more than 5% of total volume absorbed). Thus, before the sample is applied, the porous structure is in a substantially dry state, and in FIG. 3, at time zero, each zone appears white. After the sample is applied, the sample diffuses through the porous structure, starting at Zone 1. The diffusion of the sample through the porous structure darkens the porous structure in the grayscale image as shown in the second illustration. As the sample diffuses further, Zone 1 appears much darker, because it is more saturated with the sample than the zones that are not yet fully saturated. The degree of saturation of the porous structure can range from a dry state to completely saturated. The degree of sample saturation thus corresponds to discrete changes in optical saturation value.

With respect to the optical saturation values, color or grayscale intensities may serve as suitable saturation values. For example, 8-bit, 10-bit, 12-bit, 14-bit, 16-bit, 18-bit, 24-bit, or 32-bit color or grayscale values can be used to determine optical saturation values. The inventors contemplate that monochrome images can also be used. Such images can be obtained using monochromatic light detectors, physical filters, and/or digital image color filtering. In preferred embodiments, 8-bit grayscale values (256 shades of gray) are converted to range from 0 (black) to 1 (white) with intervening values. In even more preferred embodiments, 8-bit grayscale values are converted to percentages from 0% (black) to 100% (white).

For example, in FIG. 3, at time zero, right after a sample begins to diffuse into the top segment (Zone 1) of the porous structure 304, but before the sample has wicked into the porous structure, the porous structure appears substantially white (e.g., optical saturation value of 75). The sample liquid front is parallel to the edges of each zone that are perpendicular to the direction of flow. At a later time, Zone 1 of the porous structure appears darker than it appeared at time zero (e.g., optical saturation value of 64). Likewise, Zones 2 and 3 appear darker (e.g., optical saturation value of 70), although not as dark as Zone 1, which is more saturated than Zones 2 and 3. The liquid is just beginning to saturate Zone 4 (e.g., optical saturation value of 73). At a much later time, as shown in the far right schematic representation of porous structure 304, Zone 1 is fully saturated and appears dark (e.g., optical saturation value of 57). Zones 2-4 are nearly saturated (e.g., optical saturation value of 59). Zones 5 and 6 are less saturated (e.g., optical saturation value of 64) with sample than Zones 1-4. The sample has barely begun to wet Zones 7 and 8 (e.g., optical saturation values of 70 and 73, respectively). The sample has not yet reached Zone 9 (e.g., optical saturation value of 75). Thus, at least two pictures should be taken at two different times. To obtain a specified sample volume, the movement of the liquid front into one zone/segment can be dynamically monitored. When the sample enters the target zone, an actuator can be deployed to stop sample flow into the porous structure 304.

It should be appreciated that the optical saturation values (especially when expressed or measured in grayscale) are independent of the reflectance of the porous structure and the spectroscopic characteristics of the sample, e.g., transmittance and absorbance of the sample pursuant to Beer-Lambert law. Because the speed of optical saturation is an independent parameter, the slope of the optical saturation curve versus time can serve as metadata that correlates with volume, sample composition, and integrity. Conceivably, analytic devices could include a secondary camera or color analysis, e.g., the degree of hemolysis in a whole blood sample can be monitored by analyzing images of the porous structure in red spectrum. Another example of using color to determine sample quality is to use the yellow content of an image of a sample in the porous structure to detect bilirubin in serum. Thus, analytic devices are contemplated wherein high yellow content is indicative of hyperbilirubinemia. Detection of hemolysis, hyperbilirubinemia, or other indicators of sample quality may be a sign that downstream assays should not be performed on the sample. However, such analysis can be further simplified as is described in more detail below.

Using changes in the optical saturation value for each segment over time, indicia, and/or a wicking time, the controller calculates a sample volume, a saturation speed, an indicator of sample quality, a correction factor, and/or a corrected test result. The optical saturation values can also be used to evaluate the integrity of the porous structure. Because it is expected that the sample will diffuse uniformly through the porous structure, discontinuity in the optical saturation value, relative optical saturation value, saturation rate, etc. may be indicative of a defect in the porous structure. Defects can take the form of tears, breaks, creases, bubbles, or other irregularities that affect sample diffusion. In cases when this defect will affect the results of an assay run on the sample, the assay can be aborted. Additionally, an alert or signal can be generated that tells the operator that the integrity of the porous structure is compromised.

With respect to suitable light sources, the light source 206 can be integrated into the camera 203 as shown in FIG. 2A. Alternatively, or in addition, one or more light sources that are independent of the camera can be used. It should be appreciated that one or more types of light can be employed. For example, incandescent light, LEDs, and/or lasers can serve as light sources. Although the inventors contemplate the use of white light, the peak wavelength of the light may be tunable, e.g., using filters and/or monochrometers. In addition to visible light, IR, and/or UV light may be employed. The inventors advantageously discovered that light below 550 nm, preferably at about 490 nm (e.g., blue light between 440 nm and 490 nm), gives images that are least sensitive to deviations in the yellow/red content of serum samples. When the term "about" is used in conjunction with a numerical value, the term about means a range of plus or minus 10% of the numerical value, including end points. The inventors further contemplate the wavelength of light could be tuned depending on the nature of the sample.

For example, to detect hemolysis by a pink/red discoloration in a serum sample, green light could be selected to illuminate the sample to give maximum absorbance of the light by pinkish serum, and thus greater contrast between the saturated and unsaturated segments/zones of the porous structure. The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Images can be taken using illumination having different peak wavelengths. Ratios or differences between the saturation values for the images acquired using different wavelengths of light can be taken and used to correlate with saturation rate, volume, etc. Analysis of saturation values can be performed using 2 phase four-parameter logistics, five-parameter logistics, Fourier transform, or other computationally suitable algorithms.

In addition to cameras, other means can be employed to monitor the degree of saturation of the porous structure. For example, detectors may detect a reflection or reflected light, which corresponds to an absolute absorbance (i.e., by reflectometry). Detection may further include use of reference/calibration spots. For example, in one embodiment, the porous structure includes a dry spot and a wet saturation spot. In some embodiments, the dry spot is be given a calibration value of 0 absorbance the wet saturation spot is given a calibration value of 1. Depending on the application, some embodiments have detectors that specifically measure light intensity at each wavelength. In yet further embodiments, transmittance can be measured and used as the saturation value for further analysis.

In some contemplated embodiments, the holder, camera, controller, actuator, and/or light source can be integrated into an image acquisition system 20. The controller/processor can be further configured to read an identifier, such as optical machine-readable representation(s) of data such as UPC barcode(s), QR Code(s), etc. that indicate the assay to perform on the sample. Additionally, it is contemplated that in some embodiments the identifier includes text, colors, or symbols. In these embodiments, the image acquisition system is further configured to include an optical character recognition unit to recognize the text, colors, or symbols on the sample, that indicate which assay to perform on the sample. In some embodiments the identifier serves to identify the sample.

In some embodiments, the image acquisition system 20 includes an actuator 205 configured to stop flow of the sample into the porous structure (FIG. 2A). In some embodiments, the image acquisition system is configured to determine at least one of: a sample saturation volume, a sample saturation area, a sample saturation intensity, a sample saturation value, a sample saturation rate, etc. In yet other embodiments, the analyzer can be configured to perform the following steps: (1) record a first image of the sample holder to produce a first optical saturation value; (2) record a second image of the sample holder to produce a second optical saturation value; (3) calculate a sample saturation rate based on the change between the first optical saturation value and the second optical saturation value; (4) if the sample saturation rate meets or exceeds a threshold, signal actuator 205 to stop sample flow into the porous structure.

In a preferred analytic device, optical saturation values are measured as described above for each zone of a porous structure, before a sample is added. These optical saturation values can serve as blank values, as show in the first two rows of Table 1. Initially, the porous structure has optical saturation values of between 75.2 (time 0, Zone 1) and 82 (time 00, Zone 3). After the sample is added the optical saturation values gradually decrease. First in Zone 1, at 30 s, the optical saturation value decreased to 64.0. Then, at 90 s, the optical saturation value of Zone 9 decreased to 64.3.

TABLE 1

| | | Towards The End of Pad | | | | |
|---|---|---|---|---|---|---|
| | Time (s) | Zone 1 | Zone 3 | Zone 5 | Zone 7 | Zone 9 |
| Blank | 00 | 75.8 | 82.0 | 80.7 | 77.2 | 77.2 |
| | 0 | 75.2 | 81.5 | 80.1 | 76.7 | 76.7 |
| Post Sample | 10 | 75.1 | 81.5 | 80.4 | 77.0 | 77.1 |
| Additions | 20 | 73.9 | 81.1 | 80.1 | 76.8 | 76.9 |
| | 30 | 64.0 | 80.1 | 80.0 | 76.7 | 76.9 |
| | 40 | 59.3 | 69.5 | 78.3 | 76.4 | 76.7 |
| | 50 | 57.9 | 66.2 | 68.7 | 75.2 | 76.5 |
| | 60 | 57.5 | 63.7 | 63.3 | 68.9 | 76.1 |
| | 70 | 57.4 | 62.5 | 61.7 | 63.4 | 72.8 |
| | 80 | 57.3 | 62.2 | 61.2 | 60.8 | 67.7 |
| | 90 | 57.3 | 61.9 | 61.0 | 59.5 | 64.3 |

The optical saturation values can be used to generate relative saturation values. Relative saturation values are the difference between the optical saturation values obtained after sample addition and blank optical saturation values. Table 2 shows exemplary relative saturation values. As in the experiment shown, when the optical saturation value decreases after sample addition (i.e., the porous structure becomes darker), the relative saturation values are negative.

TABLE 2

| Time (s) | Zone1 | Zone3 | Zone5 | Zone7 | Zone9 |
|---|---|---|---|---|---|
| 0 | −0.3 | −0.3 | 0.0 | 0.0 | 0.1 |
| 10 | −1.5 | −0.6 | −0.3 | −0.2 | −0.1 |
| 20 | −11.5 | −1.6 | −0.4 | −0.3 | −0.1 |
| 30 | −16.2 | −12.3 | −2.1 | −0.5 | −0.3 |
| 40 | −17.6 | −15.5 | −11.8 | −1.7 | −0.5 |
| 50 | −18.0 | −18.1 | −17.1 | −8.0 | −0.9 |
| 60 | −18.1 | −19.2 | −18.7 | −13.5 | −4.1 |
| 70 | −18.2 | −19.5 | −19.2 | −16.1 | −9.3 |
| 80 | −18.1 | −19.9 | −19.5 | −17.4 | −12.7 |

Figure 4:
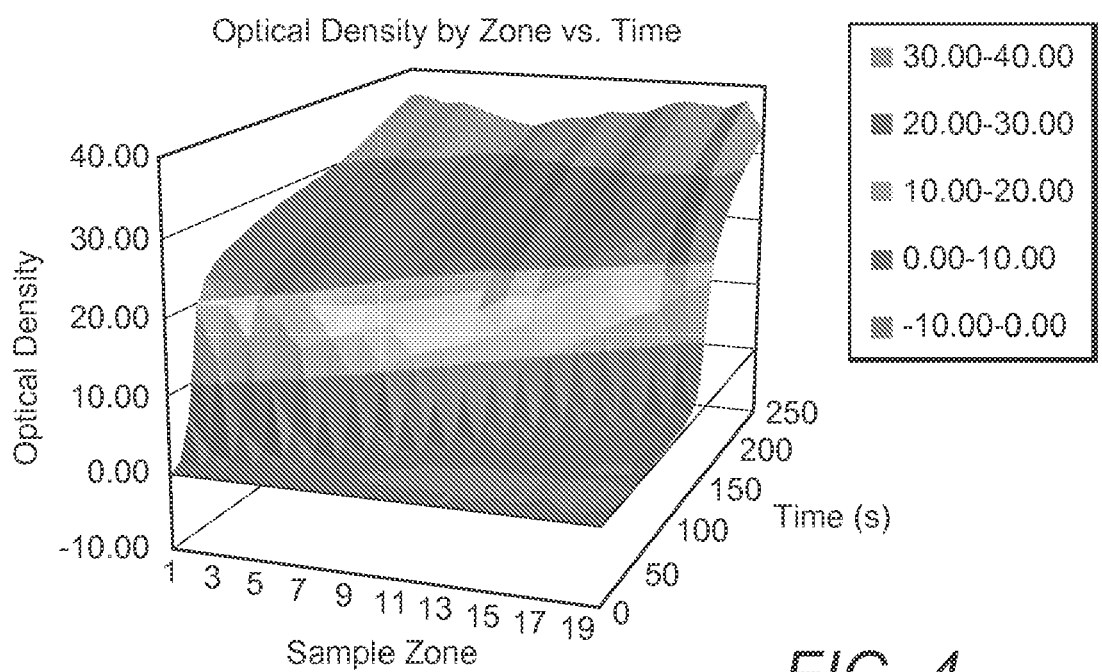
FIG. 4 is a three dimensional plot of optical saturation value changes as a function of segments (sample zones) and time (seconds).

FIG. 4 shows a three dimensional plot of "Optical Density" for each zone as a function of zone and time (seconds). Here the "optical density" is analogous to the optical density of solutions, wherein the change in optical saturation value is divided by the optical saturation value of a blank (dry) porous structure multiplied by 100%. Contemplated analytical devices and methods can measure changes in optical saturation and analyze the optical saturation value data using control logic that is either on board the analytical device or part of removable device, mobile phone, or camera. For example, in embodiments employing mobile phones or tablets, the control logic is an app installed on a mobile phone/tablet.

It is further contemplated that in some embodiments the analytic device is further configured to perform one or more of: verify test result(s), print test result(s), report test result(s), apply correction factor(s), calculate test value(s), monitor the slope or kinetics of test value(s).

Figure 5:
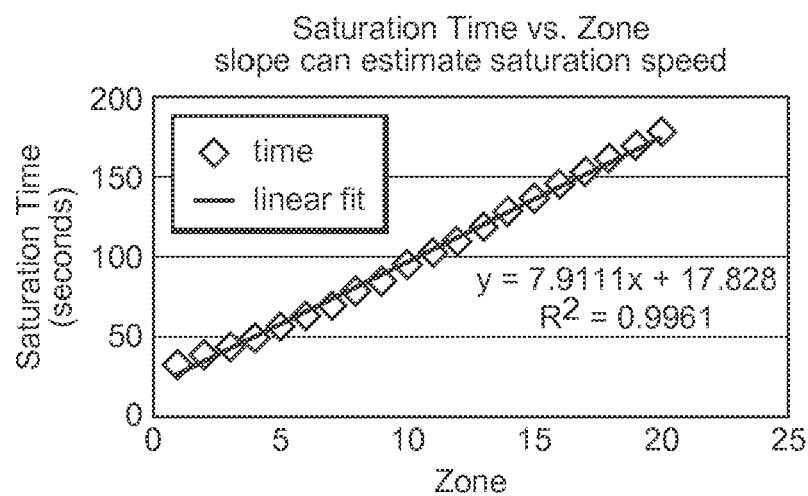
FIG. 5 is a graph of time to optical saturation versus segments (zone number).

It is contemplated factors such as sample saturation speed and saturation volume can be estimated by monitoring the degree of optical saturation over time. In one example, sample saturation is deemed complete when the optical saturation value has changed by a specified number of units, for example, 5, 10, 15, 20, 30, 50 or more percent. For example, the porous structure monitored in Table 1 was deemed saturated when the optical saturation value of Zone 9 decreased by ten percent. The inventors contemplate that such optical saturation parameters can be further refined. Thus, FIG. 5 shows a graph of optical saturation by zone over time, and the inverse of the slope is a measure of saturation speed. In another example, the analytical device is configured to record the time in seconds when the optical saturation of each zone meets or exceed a threshold to produce saturation time for each zone. In yet another example, a metric such as the area of the porous solid that has an optical saturation value below a threshold value can be used to calculate the sample saturation speed. In some embodiments, the analytical device is further configured to perform a regression (e.g. linear regression, quadratic regression) on the saturation times for each zone to produce a predictor value (e.g. a slope). The analytical device then uses the predictor value to estimate the saturation speed. It is contemplated that saturation speed can correlate with a number of various important metrics relating to the sample, such as sample volume, sample composition, etc.

Example A: Testosterone Concentration Analysis

In one experiment, the researchers loaded 120 μL of whole blood spiked to contain 1000 ng/dL (10 ng/mL) in the sample receiving compartment. The sample was allowed to wick through the porous structure until the optical saturation value of Zone 3 decreased by ten units. The concentration of testosterone in the serum was then analyzed. The experiment was repeated allowing Zones 10 and 20 to become saturated, and at 6 minutes (i.e., well after the entire porous solid was saturated). Each experiment was repeated five times for each of Zones 3, 10, and 20. The set of experiments performed at 6 minutes are labeled "Region20*."

The data are reproduced in Table 3. As the degree of sample saturation of the porous structure increases, the measured testosterone concentration increases from approximately 400 ng/dL to almost 900 ng/dL. Thus, the more saturated the porous structure, the closer the measured value was to the known 1000 ng/dL testosterone concentration.

TABLE 3

| Instrument | Last Zone Saturated | Testosterone Concentration (ng/dL) | Avg. | % CV |
|---|---|---|---|---|
| A | 3 | 415 | 488 | 11.9 |
| B | 3 | 503 | | |
| C | 3 | 545 | | |
| D | 3 | 440 | | |
| E | 3 | 536 | | |
| A | 10 | 670 | 676 | 11.8 |
| B | 10 | 555 | | |
| C | 10 | 709 | | |
| D | 10 | 775 | | |
| E | 10 | 670 | | |
| A | 20 | 765 | 821 | 8.0 |
| B | 20 | 758 | | |
| C | 20 | 819 | | |
| D | 20 | 843 | | |
| E | 20 | 920 | | |
| A | 20* | 867 | 866 | 1.7 |
| B | 20* | 843 | | |
| C | 20* | 870 | | |
| D | 20* | 865 | | |
| E | 20* | 885 | | |

*after 6 minutes

Example B: Determining Correction Factors for Testosterone Concentration

Because of the relationship between optical saturation value and testosterone concentration, the inventors conducted further experiments to arrive at correction factors that could be applied to samples of various volumes. In this experiment, 90 µL of whole blood spiked with testosterone to a concentration of 1000 ng/dL (10 ng/mL) was loaded into sample receiving compartments, optical saturation values were measured for each segment of the porous structure over time, and when sample saturation was deemed complete, the testosterone concentration of the sample in the porous structure was analyzed. The experiments were performed in triplicate and repeated with whole blood volumes of 100, 120, and 140 µL. Table 4 shows the results by instrument number, blood volume, slope (inverse saturation speed), and the concentration of testosterone (ng/dL). The data show that the measured testosterone concentration approaches the known concentration (1000 ng/dL) as saturation speed increases.

TABLE 4

| Instrument | Blood. Vol (µL) | Slope (s/Zone) | Conc. (ng/dL) |
|---|---|---|---|
| A | 90 | 12.05 | 721 |
| | 100 | 7.64 | 799 |
| | 120 | 6.69 | 910 |
| | 140 | 6.63 | 922 |
| B | 90 | 14.05 | 774 |
| | 100 | 7.08 | 818 |
| | 120 | 6.54 | 888 |
| | 140 | 6.81 | 939 |
| C | 90 | 14.33 | 690 |
| | 100 | 7.74 | 803 |
| | 120 | 7.18 | 839 |
| | 140 | 7.20 | 897 |
| E | 90 | 13.08 | 772 |
| | 100 | 7.69 | 824 |
| | 120 | 6.87 | 874 |
| | 140 | 7.08 | 786 |

Figure 6:
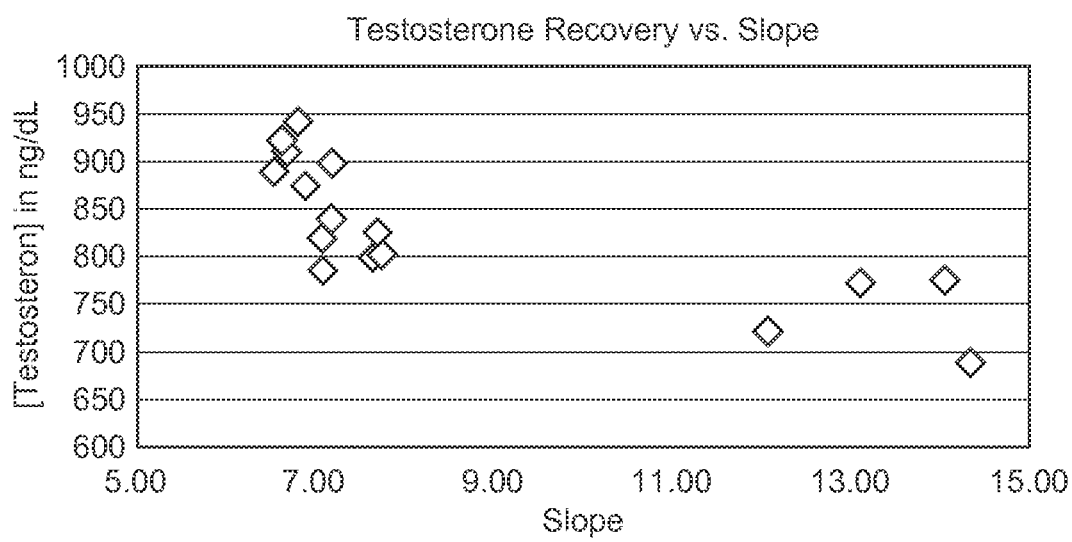
FIG. 6 is a graph of testosterone recovery versus optical saturation speed for sample volumes of 90, 100, 120, and 140 µl.
Figure 7:
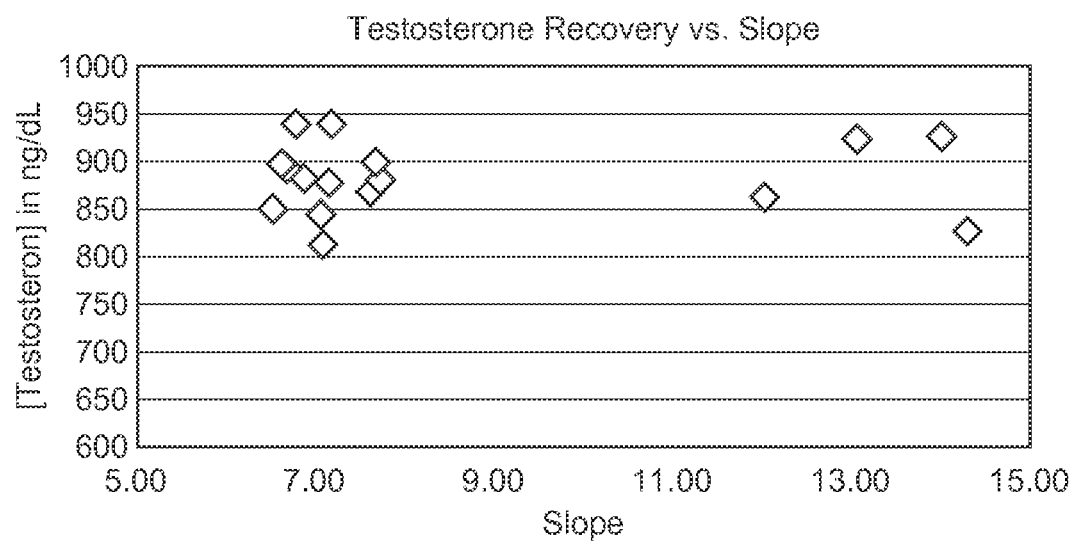
FIG. 7 is a corrected graph of testosterone recovery v. saturation speed for sample volumes of 90, 100, 120, and 140 µl.

The increase in measured testosterone concentration with saturation speed is graphically shown in FIG. 6, a plot of testosterone recovery v. saturation speed for sample volumes of 90, 100, 120, and 140 µl. From this data, the inventors used a two phase four-parameter logistic (4PL) function to arrive at a correction factor, k, the slope of the function. The corrected concentration equals the measured concentration multiplied by the correction factor, k. Advantageously, the correction factors can be used without knowing the sample volume in advance. FIG. 7 shows a plot of corrected testosterone recovery v. slope (inverse saturation speed). As shown in FIG. 7, the results are more consistent across different saturation rates, and thus more accurately reflect the known testosterone concentration. The graphical results are statistically confirmed, because the average testosterone increased from 829 to 883 ng/dL after correction, and the standard deviation decreased from 72 to 38 ng/dL. Moreover, the coefficient of variation decreased from 8.7 to 4.3, a marked improvement. Thus, the corrected results are more accurate and precise.

TABLE 5

| | Measured | Corrected | Ratio |
|---|---|---|---|
| Average | 829 | 883 | |
| Standard Deviation | 72 | 38 | |
| % Coefficient of Variation | 8.7 | 4.3 | 0.49 |

Figure 8:
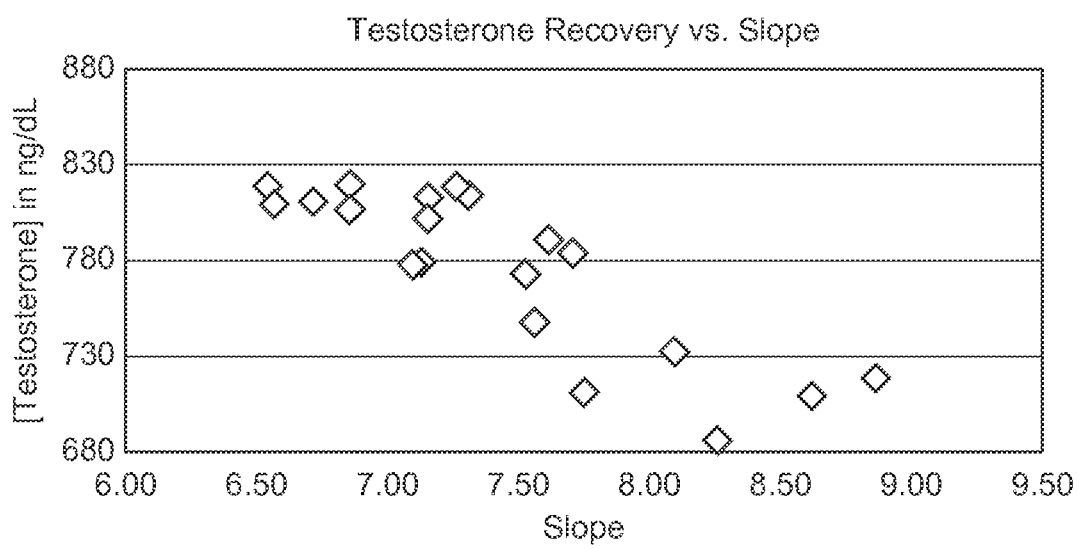
FIG. 8 is a graph of testosterone recovery v. optical saturation speed for sample volumes of 100, 110, 120, and 130 μl.
Figure 9:
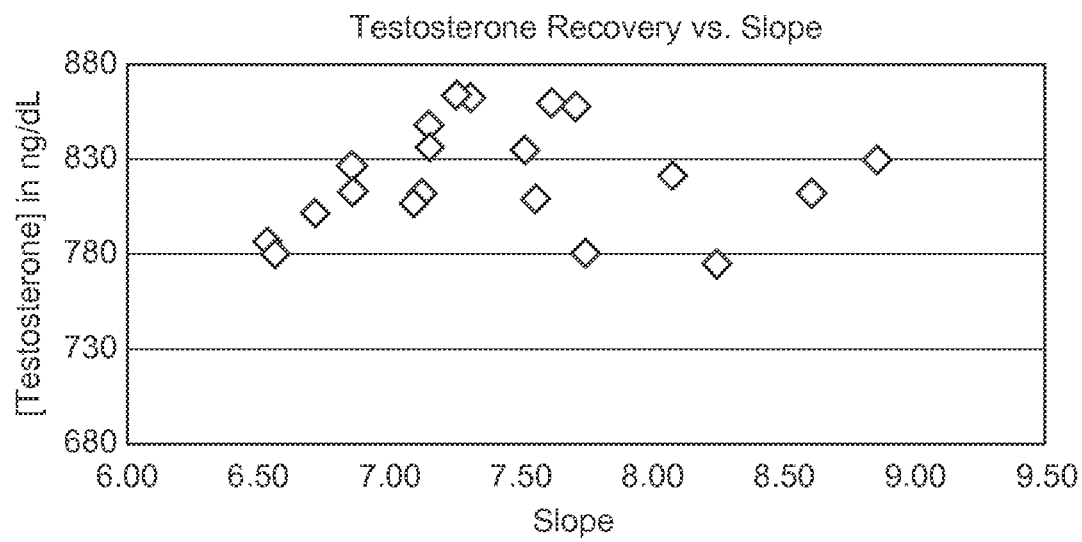
FIG. 9 is a corrected graph of testosterone recovery v. optical saturation speed for sample volumes of 100, 110, 120, and 130 μl.

This experimental protocol was repeated for whole blood volumes of volumes of 100, 110, 120, and 130 µl. A graph of testosterone recovery v. saturation speed is shown in FIG. 8. As in the previous set of experiments, the measured testosterone concentration increased with saturation speed (decreasing slope). The corrected graph is shown in FIG. 9. Statistically, more accurate and precise results were also obtained: the average testosterone concentration increased, the standard deviation decreased and the coefficient of variation decreased. Thus, the inventive analytical devices provide advantages over the methods of Gibbons, because analysis of measured optical saturation values for the zones of a porous structure correlate with analyte concentrations without the need for complicated geometric volume calculations and transmittance/absorbance measurements.

TABLE 6

| | Measured | Corrected | Ratio |
|---|---|---|---|
| Average | 776 | 820 | |
| Standard Deviation | 43 | 28 | |
| % Coefficient of Variation | 5.5 | 3.5 | 0.63 |

The inventors also contemplate that, in addition to image analysis, electrical readouts and/or conductivity could be used as saturation values. For example, the porous solids can be pixilated at the surface with electrodes to read resistance. Other saturation detection mechanisms can include detection of a resonance frequency or force. Additionally, depending on the desired result, visual analysis can be enhanced by depositing a dye on the porous structure at the interface with the sample receiving compartment such that the sample carries the dye as it wicks into the porous structure. Alternatively the sample can react with the dye, and the reaction products diffuse into the view of the image acquisition system as the sample is drawn into the porous structure by capillary action. The porous structure can also be treated with detergents, printed with hydrophilic or hydrophobic inks, or treated by other chemical or physical means to direct path of fluid.

Figure 10:
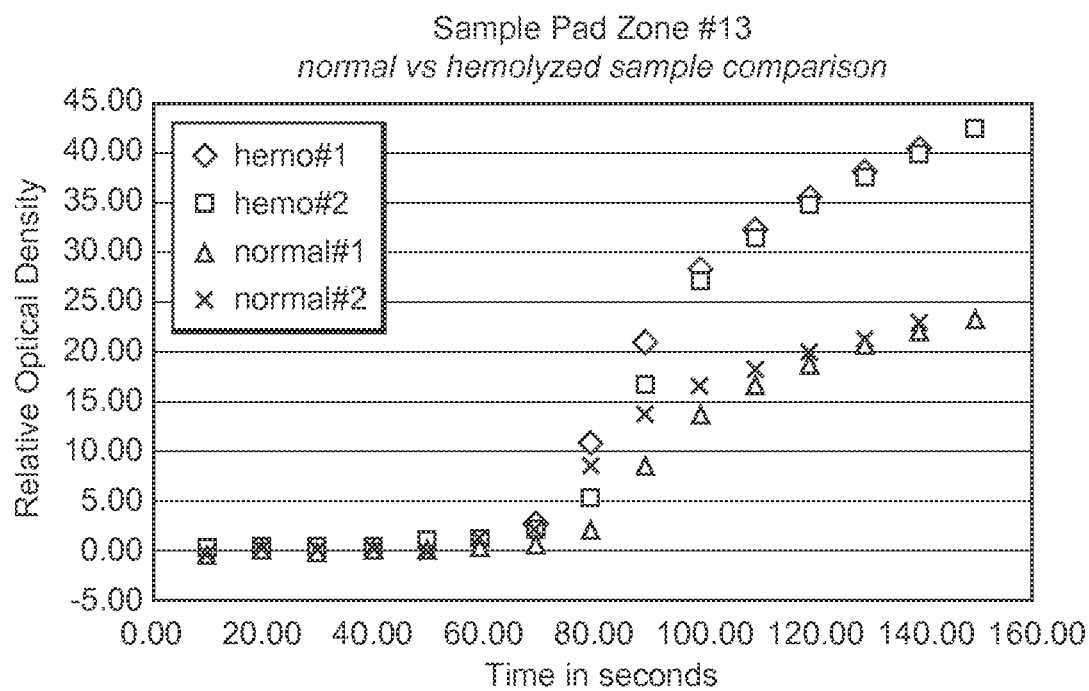
FIG. 10 is a graph depicting change in optical saturation over time for a single segment (Zone #13) comparing normal versus hemolyzed samples.

FIG. 10 shows data comparing the increase in relative optical density in Zone 13 for normal and hemolyzed blood samples. The relative optical density of the normal samples begins to increase between 60 and 80 seconds after the sample is applied to the sample application location. The relative optical density gradually increases to between 20 and 25 units. The relative optical density of the hemolyzed sample also begins to increase between 60 and 80 seconds after sample application. In contrast, the relative optical density of Zone 13 increases more rapidly and reaches between 40 and 45 units at 150 seconds. The more rapid increase and/or higher optical saturation values can be used to generate indicators of sample quality. In cases when the sample quality indicator corresponds to a degraded or otherwise compromised sample, an alert can optionally be generated. The controller can also cancel an assay when the sample indicator indicates that the sample does not meet minimum quality standards.

Thus, the present disclosure provided many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed. As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise. Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

It should be apparent to those skilled in the art that many more modifications besides those already described are possible without departing from the inventive concepts herein. The inventive subject matter, therefore, is not to be restricted except in the scope of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A device for determining a fluid volume contained in a porous structure, comprising:
   a holder configured to retain a container having a sample receiving compartment, wherein the porous structure is at least partially disposed in the sample receiving compartment;
   a camera configured to take at least one image of the porous structure; and
   a controller communicatively coupled to the camera and configured to:
   i. detect an area of the porous structure in the at least one image;
   ii. divide the area of the porous structure into a plurality of segments;
   iii. determine an optical saturation value for each one of the plurality of segments, wherein each of the optical saturation values correlates with a degree of sample saturation of the porous structure; and
   iv. calculate, using the optical saturation value of at least one of the plurality of segments of the porous structure, at least one of a sample volume, a sample saturation speed, an indicator of sample quality, and an adjustment correction factor as a function of the optical saturation value and a wicking time of at least one of the plurality of segments; and
   an actuator configured to stop a sample from flowing from a sample application location to the porous structure, and wherein the controller is further configured to calculate the sample volume in the porous structure in real time and to trigger the actuator to stop flow when the sample volume reaches a predetermined threshold.

2. The device of claim 1, wherein the porous structure comprises a round shape.

3. The device of claim 1, wherein the controller is further configured to determine if an assay should be performed using the fluid volume.

4. The device of claim 1, wherein the porous structure is deformable such that the porous structure is capable of repeatedly soaking in and expressing out reagents.

5. The device of claim 1, wherein the sample receiving compartment is at least partially formed from a transparent polymer, and wherein the camera and a light source are positioned relative to the sample receiving compartment to reduce image capture of light reflected off the transparent polymer.

6. The device of claim 1 wherein the controller is configured to process the optical saturation values in a grayscale.

7. The device of claim 1 wherein the controller is configured to determine the optical saturation value for each one of the plurality of segments at least once every 30 s.

8. A controller for correlating a plurality of optical saturation values of an image of a porous structure with a sample volume in the porous structure, the controller comprising:
 a processor configured to divide the image into a plurality of segments and to assign respective optical saturation values for each segment for at least a first and second time point;
 wherein the processor is further configured to calculate, using differences between the respective optical saturation values for each segment, at least one of: a normalized optical saturation value for each one of the plurality of segments, a sample saturation of each one of the plurality of segments, a saturation speed, an adjustment factor, and an indicator of sample quality; and
 wherein the processor is further configured to provide a control signal to an actuator that regulates sample flow into the porous structure upon reaching a predetermined sample saturation in the porous structure.

9. The controller of claim 8, wherein the processor is further configured to calculate the differences in grayscale.

10. A method of evaluating sample quality comprising:
 measuring an optical saturation value from a porous structure at specified time intervals;
 determining a saturation rate;
 calculating a difference between the change in saturation rate with a reference saturation rate indicative of at least one of an intact sample and a compromised sample;
 using the difference between the saturation rate and the reference saturation rate to generate an indicator of sample quality; and
 upon determination of the sample quality as being a degraded sample or a compromised sample, canceling the assay or generating an alert.

* * * * *